Patented Oct. 31, 1944

2,361,867

UNITED STATES PATENT OFFICE 2,361,867

SOLDERING FLUX

Leopold Pessel, Philadelphia, Pa., assignor to Radio Corporation of America, a corporation of Delaware No Drawing. Application February 1, 1943, Serial No. 474,386

8 Claims. (Cl. 148—25)

This invention relates to solders, and more particularly to a fluxing agent therefor.

The use of relatively low melting point solders is well known for joining two or more metals together. To render such solders effective, it is customary to employ a flux for cleaning the surfaces of the parts to be united by removal of oxide-coatings therefrom. Such fluxes are acidic in nature. There are, however, many applications of solders where acidic fluxes, such as zinc chloride, for example, cannot be used due to the corrosive effect of the flux residue. This is particularly true for those applications where thorough washing of the joined parts cannot be carried out after the soldering operation. In such cases, it has been customary to use an alcoholic rosin solution, but the fluxing property of such a solution is very limited.

The primary object of my present invention is to provide a novel solder fluxing agent which will be free from the above mentioned objections to prior art fluxes.

More particularly, it is an object of my present invention to provide a novel solder fluxing agent which will not only condition the parts to be soldered together for effective union by the solder, but which will have no corrosive effect.

Another object of my present invention is to provide an improved solder flux which is not limited in usefulness or in application.

Still another object of my present invention is to provide an improved solder flux as aforesaid which is inexpensive in cost, and which is highly efficient and reliable in use.

In carrying out my present invention, I make use of certain keto fatty acids or substituted keto fatty acids which I have found to be admirably suited for use as solder fluxing agents. For example, levulinic acid, or gamma keto valeric acid, may be used as a solder flux, either in its pure state or in aqueous or alcoholic solution. It may also be used effectively when dissolved in any of its other solvents. The amount of this fluxing agent used in solution may be varied over a wide range, the fluxing action extending over the full range of concentrations, although being more pronounced in the more concentrated solutions. I have found that it is particularly advantageous to combine these materials with some solid flux, such as rosin, to obtain a solid flux residue.

The novel features that I consider characteristic of my invention are set forth with particularity in the appended claims. The invention itself, however, together with additional objects and advantages thereof will best be understood from the following more detailed description:

As stated heretofore, I have found that levulinic acid, for example, has excellent fluxing properties, and this is true both on ferrous and non-ferrous metals. A concentration of about 25 per cent of levulinic acid in the fluxing compound seems to offer an optimum of advantages, but higher or lower concentrations may be used. The levulinic acid may be used either in its pure form, in aqueous solution, alcoholic solution, or combined with any other suitable solvent. I have found that it is particularly useful when combined with certain other carriers, such as rosin or other resinous materials which may or may not be derivatives of rosin, or with certain wax-like substances of high molecular weight. An important function of the rosin or the like is to act as a solid carrier for the levulinic acid, the commercial form of which is itself a liquid at room temperature. A levulinic acid-rosin flux, after cooling, is a solid which does not show any pronounced tendency to flow or smear. While it is readily removed by means of alcohol, or alcohol acetone mixtures, the solid nature of this flux residue makes it possible to leave it in place, without removal, after soldering, except where such removal is required for the sake of appearance. As indicated heretofore, other keto valeric acids and/or their substitution products, and other suitable solid carriers which are mutually soluble with levulinic acid or the other acids or substitution products may be used for the same purpose.

An example of a flux formulated in accordance with this invention is as follows:

| | Parts by volume |
|---|---|
| Rosin solution (15 lbs. of pale rosin in 5 gallons of denatured alcohol) | 3 |
| Levulinic acid (98 per cent–99 per cent) | 1 |

A grit-blasted steel surface treated with such a solution was readily tinned with 60–40 lead-tin solder by means of a conventional, hot soldering iron.

Although I have described my invention in some detail, it will be apparent to those skilled in the art that many variations thereof, both as to the specific materials and as to the relative quantities thereof to be used, are possible. I therefore desire that my invention shall not be limited except insofar as is made necessary by the prior art and by the spirit of the appended claims.

I claim as my invention:

1. A solder fluxing agent composed of a mixture in which the principal ingredients are a keto fatty acid and a solid carrier therefor.

2. A solder fluxing agent composed of a mixture in which the principal ingredients are levulinic acid and a solid carrier therefor.

3. A solder fluxing agent composed of a mixture in which the principal ingredients are levulinic acid and a wax-like carrier therefor.

4. A solder fluxing agent composed of a mixture in which the principal ingredients are levulinic acid and a resinous material.

5. A solder fluxing agent composed of a mixture in which the principal ingredients are levulinic acid and rosin.

6. A solder fluxing agent composed of a mixture in which the principal ingredients are levulinic acid and rosin in the following proportions:

| | Parts by volume |
|---|---|
| Levulinic acid (98 per cent–99 per cent) | 1 |
| Rosin (15 lbs. of pale rosin in 5 gallons of denatured alcohol) | 3 |

7. A solder fluxing agent composed of a mixture in which the principal ingredients are a substituted keto-valeric acid and a solid carrier therefor.

8. A solder fluxing agent composed of a mixture in which the principal ingredients are a material selected from the group consisting of keto fatty acids and substitution products thereof and a solid carrier for said material.

LEOPOLD PESSEL.